April 26, 1966 C. R. LAKE 3,247,987
PIPE HANDLING SIDE BOOM
Filed March 20, 1964 2 Sheets-Sheet 1
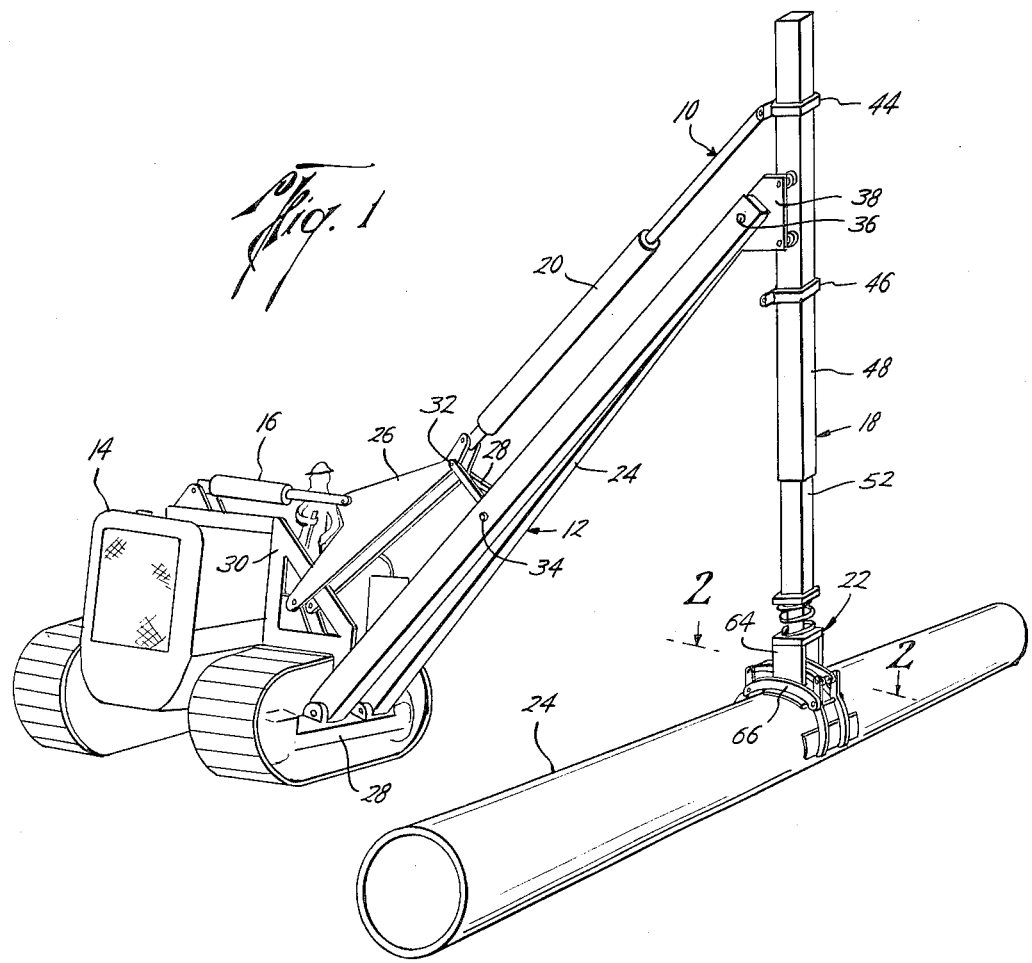
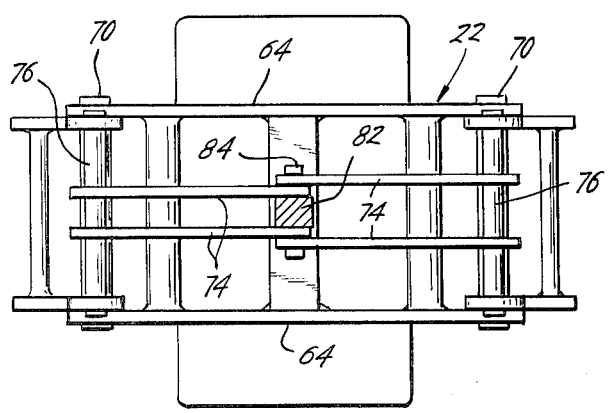
Chester R. Lake
INVENTOR.
BY
ATTORNEYS April 26, 1966 C. R. LAKE 3,247,987
PIPE HANDLING SIDE BOOM
Filed March 20, 1964 2 Sheets-Sheet 2
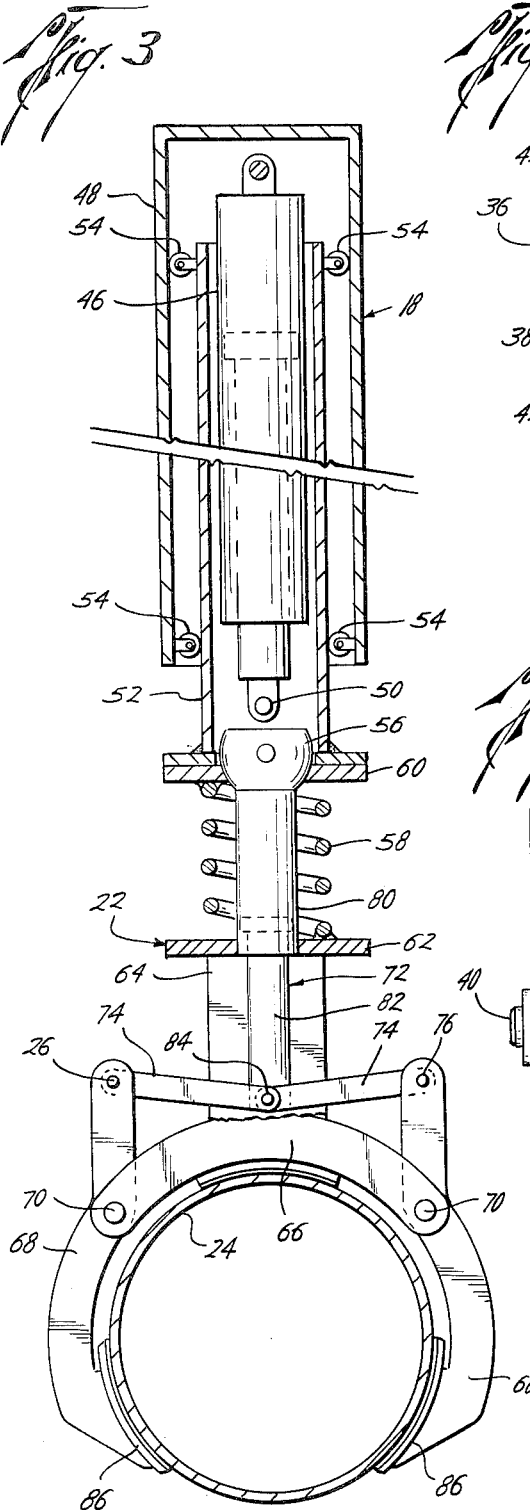
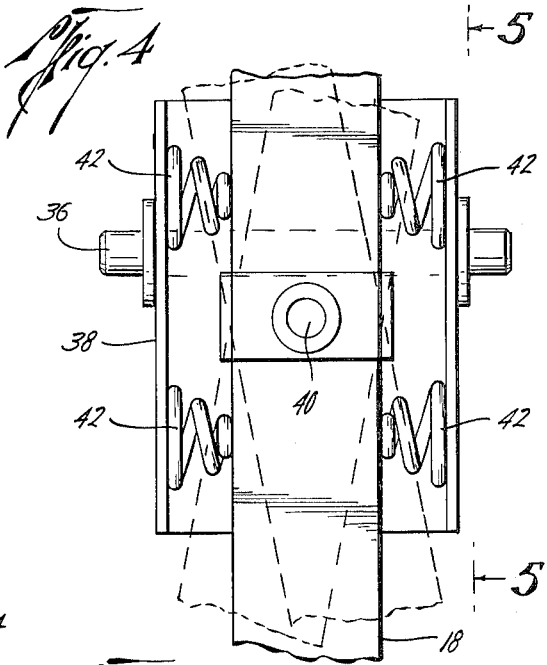
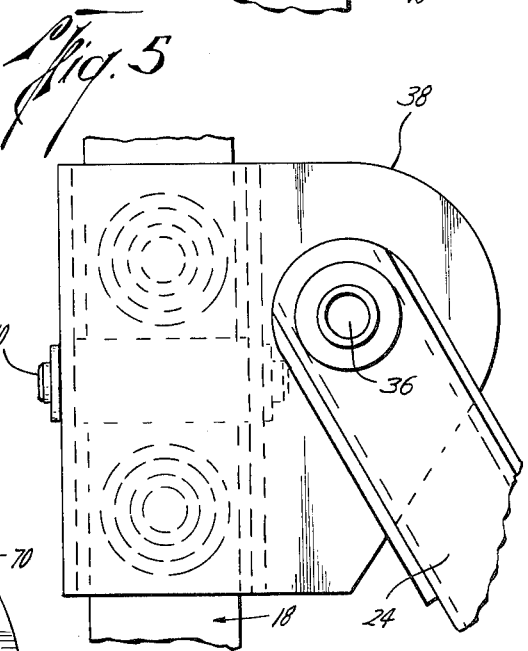
Chester R. Lake
INVENTOR.
BY James F. Weiler
Jefferson D. Gilly
William A. Stout
Paul L. DeVerter II
ATTORNEYS United States Patent Office 3,247,987
Patented Apr. 26, 1966

3,247,987
PIPE HANDLING SIDE BOOM
Chester Rabourn Lake, 4850 Gasmer, Houston, Tex.
Filed Mar. 20, 1964, Ser. No. 353,499
6 Claims. (Cl. 214—147)

The present invention relates to a pipe handling side boom, and more particularly, relates to a hydraulically actuated pipe handling side boom attachment for connection to the side of a tractor.

Generally, in laying a pipeline, a trench is dug in the ground and the lengths of pipe are laid end to end and joined together such as by welding and are laid into the trench, either before or after they are joined to adjacent lengths of pipe. However, in laying pipe underground and otherwise handling and transporting lengths of pipe the use of auxiliary equipment and men is required. The present invention is directed to various improvements in a pipe handling attachment which is adapted to be connected to the side of a tractor.

It is a general object of the present invention to provide a hydraulically actuated side boom attachment for a tractor for picking up the pipe, yieldably holding it in a parallel position with the tractor and which after movement by the tractor can quickly and easily place it in a desired position.

A still further object of the present invention is the provision of a hydraulically actuated side boom attachment for connection to a tractor which includes a boom mounted on the side of the tractor, an arm pivotally secured to the boom for movement toward and away from the boom, the arm including a telescoping piston and cylinder assembly for vertically raising and lowering a length of pipe whereby a length of pipe may be longitudinally moved by the tractor and may be transversely moved in any position by suitable actuation of the boom and arm.

A still further object of the present invention is the provision of a boom assembly adapted to be attached to the side of a tractor for handling pipe which includes a first linkage member pivotally connected to the side of the tractor and to a hydraulic cylinder and piston assembly for moving the linkage, a second linkage member connected to the first linkage member and to the boom whereby the angle of the boom may be easily adjusted and the linkages and the boom assume the greater part of the load whereby the piston and cylinder is not required to have an excessive stroke.

Still a further object of the present invention is the provision of a hydraulically actuated side boom attachment for handling pipe which includes a hydraulic pipe gripping assembly whereby when the jaws are moved into gripping position past the dead center position they will lock in place and grip and support the pipe without requiring the hydraulic actuating gripping assembly to be sized to support the pipe weight.

A still further object of the present invention is the provision of a side boom attachment for pipe handling which includes yieldable spring supporting connections and avoids the use of rigid boom connections at critical points which would be subject to shock and damage by the movement of the pipe as it is being transported.

Yet a further object of the present invention is the provision of a hydraulically actuated side boom attachment for handling pipe which includes a universal joint connection supporting a pipe gripping assembly to a boom arm and includes a spring positioned between the arm and the pipe gripping assembly yieldably aligning the pipe gripping assembly with the arm whereby the pipe is yieldably held in a parallel position with the tractor.

A still further object of the present invention is the provision of a side boom attachment for connection to a tractor for handling pipe wherein an arm is pivotally secured to a boom for movement to and from the boom and the pivoted connection includes a frame connected to the arm and supporting the arm for pivoted transverse movement and includes spring means for yieldably moving the arm in a vertical plane with the boom but which will allow for transverse movement of the pipe relative to the boom as the pipe is moved.

Other and further objects, features and advantages, of the invention will be apparent from the description of a presently preferred embodiment of the invention, given for the purpose of disclosure and taken in conjunction with the accompanying drawings, where like character references designate like parts throughout the several views, and where, FIGURE 1 is a perspective view illustrating the pipe handling boom attachment of the present invention connected to the side of a conventional tractor, FIGURE 2 is an enlarged cross-sectional view taken along the line 2—2 of FIGURE 1, FIGURE 3 is an enlarged fragmentary elevational view, partly in cross-section, illustrating the details of construction of the arm and pipe gripping assemblies, FIGURE 4 is a fragmentary elevational view, partly in cross-section, illustrating the connection of the arm to the boom, and FIGURE 5 is a cross-sectional view taken along the line 5—5 of FIGURE 4.

Referring now to the drawings, and particularly to FIGURE 1, the hydraulically actuated pipe handling side boom attachment of the present invention is generally designated by the reference numeral 10. The attachment generally includes a boom assembly 12 adapted to be pivotably secured to the side of a tractor 14, a hydraulic cylinder and piston assembly 16 for moving the boom assembly 12, an arm 18 pivotably secured to the boom assembly 12, a second piston and cylinder assembly 20 for moving the arm 18 toward and away from the boom assembly 12 and a pipe gripping assembly 22 connected to the arm 18 for gripping and holding a length of pipe 24.

The boom assembly 12 preferably includes an A frame member 24, a first linkage member 26 and a second linkage member 28. The boom assembly is adapted to be connected to the side of a conventional tractor 14, no further description of which is believed necessary, for transporting and moving a length of pipe 24 along with and parallel to the tractor. The boom assembly 12 is pivotably secured to the side of the tractor to any suitable supports such as supports 28 and 30 and the boom is actuated to and from the tractor 14 by means of the hydraulically actuated piston and cylinder assembly 16 by controls which are conventional and no further description is believed to be necessary. While of course the piston and cylinder assembly 16 could be connected directly to the A frame unit 24, the use of the linkage members 26 and 28 allow a wider angle of movement of the boom on a corresponding shorter stroke of the piston and cylinder assembly and in addition provide a structure to take part of the load thereby allowing the use of a shorter stroke and less expensive cylinder and piston assembly 16. The linkage member 26 is pivotably secured to the support 30 of the tractor 14 and in addition the linkage members 26 and 28 are pivotably secured at point 32. The linkage member 28 is also pivotably secured to the A frame member 24 at point 34.

As best seen in FIGURES 1 and 4, the arm 18 is pivotally supported from the boom assembly 12 from a pin member 26 and may include a supporting frame 38. Normally, the only desired movement of the arm 18 relative to the boom 12 is in a plane toward and from each other. However, as seen in FIGURE 1, as the tractor moves the pipe 24 along in a position parallel to the tractor, the mass and momentum of the pipe 24, which may be in the 20,000 to 30,000 pound range, will cause a force or shock load on the arm 18 acting parallel to the tractor placing a severe strain on the rigid connection on the pin 36. Therefore, frame support member 38 is provided which is pivoted from the pin 36 and in turn is connected to and supports the arm 18 by allowing pivoting movement of the arm 18 about a pin 40 which is at right angles to the pin 36. Between the frame 38 and on each side of the arm 18, preferably both above and below the pin 40, suitable springs 42 are provided which although allowing for the movement of the arm 18 and pipe 24 parallel to the tractor 14, tend to keep the arm 18 in a vertical plane with the boom assembly 12. Thus, by the feature of supporting the frame 38 from the pivot pin 36 and supporting the arm 18 from the frame 38 by a pivot pin 40 which is at right angles to the pin 36 impact load caused by movement of the pipe 24 will not damage the operation of the attachment 10 since the connection between the arm 18 and A frame 24 is not a rigid connection.

A second piston and hydraulic cylinder 20 is provided one end of which is pivotably secured to the boom assembly 12 and the second end is pivotably secured to the arm 18 by means of an adjustable strap 44, which may be suitably spaced along the arm 18 to provide the desired amount of leverage about the pivoting pin 36. While the adjustable strap 44 is shown being connected to the arm 18 above the pivoting pin 36, it is preferable to connect the piston and cylinder assembly 20 to the arm 18 to an adjustable strap 46 at a point below the pivoting pin 36 as this makes the point of connection of the piston and cylinder assembly 20 on the arm 18 nearer to the load and thus provides better support for the boom. In that event, the piston and cylinder assembly 20 would extend through the A frame 24.

Referring now to FIGURE 3, the arm 18 may include any suitable piston and cylinder assembly arrangement desired for vertically raising and lowering the pipe gripping assembly 22 for placing the length of pipe 24 into position in a pipe trench. Thus, piston and cylinder assembly 46 may be provided one of which, such as the cylinder, is secured to member 48 of the arm 18 while the piston is secured at point 50 to a telescoping member 52 which moves up and down inside of the member 48. Suitable supporting wheels 54 may be connected between the telescoping members 48 and 52 to prevent binding between these members as they are moved relative to each other.

Still referring to FIGURE 3, another feature of the present invention is the support of the pipe gripping assembly 22 from the arm 18. A universal joint 56 is provided supporting the pipe gripping assembly 22 from the arm 18. A spring 58 is provided between the plates 60 and 62 and the ends of the spring 58 are connected to the plates 60 and 62 preferably by welding. Thus, since the plate 60 is connected to the arm 18, and the plate 62 is connected to the pipe gripping assembly 22, the spring 58 acts to keep the pipe gripping assembly 22 in longitudinal and torsional alignment with the arm 18. However, shocks, impacts and other movements of the pipe 24 will cause no damage because of the play in the universal joint 46 and spring 58. Preferably, the spring 58 is sized to have the same capacity in tension as the pipe load 24 thereby relieving the joint 56 of the load. It is particularly noted that as the pipe is being either transported over rough ground or being aligned with another pipe, that a workman at one end of the pipe may easily move the pipe 24 in any direction if necessary, but normally the spring 58 will hold the pipe 24 in a parallel position relative to the tractor 14 and will not require any other workman other than the tractor operator to manipulate and handle the pipe 24.

Referring now to FIGURES 1, 2 and 3, the operation of the hydraulic pipe gripping assembly 22 is best seen. A support member which may include side plates 64 which are connected to and supported by plate 62, and an arcuate member 66 which is in turn connected to and supported by the side plates 64. Pivotably connected to the arcuate member 66 are a pair of movable jaws 68 which are pivotably connected by pins 70 to the arcuate support member 66. The actuation mechanism generally indicated by the numeral 72 may include a pair of actuating links 74 which are connected to the jaw member 78 by pins 76. A suitable actuating mechanism may include a fourth piston and cylinder assembly 80 wherein the piston member 82 is pivotably connected to the actuating link 74 by pin 84. Thus, as the piston shaft 82 is moved upwardly the jaws 68 are moved outwardly. However, as shown in FIGURE 3, when the piston shaft 82 moves downwardly the jaws 68 are closed and when the pivot pin 84 is moved past a plane between the pivot pin 77, the jaws 68 are locked into position.

By moving the linkage members 74 past the dead center position it is noted that jaw 68 and the support members 64 and 66 support the pipe 24 and the piston and cylinder assembly 80 is not required to be sized to have the same capacity as the carrying load. The jaw 68 may include conventional arcuate holding pads 86.

The hydraulic connections and controls for the piston and cylinder assemblies 16, 20, 46 and 80 are not shown as they are conventional and within the skill of the art and no further description is believed necessary.

In use, the attachment 10 can be operated by a single operator, the tractor operator, to pick up, carry, and handle lengths of pipe 24. That is, by the operation of the hydraulic piston and cylinder assembly 16 the boom assembly 12 can be moved away from and toward the tractor 14, the piston and cylinder assembly 20 may be actuated to rotate the arm 18 toward and away from the boom assembly 12 and tractor 14 and the piston cylinder assembly in the arm 18 may be actuated to longitudinally move the telescoping member 52 within the member 48 to place the pipe gripping means 22 around the pipe 24. The piston and cylinder assembly 80 (FIGURE 3) may be actuated to then close the jaws 68 about the pipe 24 and by moving the pivot point 84 past dead center on a plane including the pivot rods 77 the jaws 68 will be locked in place about and hold the pipe 24. The pipe 24 may then be picked up and carried along by the tractor 14 to the desired location. It is noted from FIGURE 3 that while the pipe 24 is normally held in a parallel position to the tractor 14 by the universal joint 56 and the spring 58 the pipe 24 may still be suitably maneuvered in any desired direction by a single workman at one end of the pipe 24 to allow the pipe 24 to avoid obstructions or to assist in aligning it with another pipe in the event of joning it to another length of pipe. In addition, the universal joint 54 and spring 58 will allow movement of the pipe 24 on a nonrigid connection thereby avoiding any shock damage to the attachment 10 by virtue of that movement. It is noted that because of the telescoping movement of the arm 18 that the pipe may quickly and conveniently be layed in a trench in the ground by the vertical movement of the arm 18.

In addition, the use of the frame support member 38 between the arm assembly 18 and the boom assembly 12 provides another flexible connection whereby the momentum and oscillating movement of the heavy load will not be directed against a rigid connection. Thus, the arm 18 may yieldably move about pivot pin 40 (FIGURE 4) which is at right angles to the pivot pin 36 to allow transverse movement of the arm 18 in a plane containing both the arm 18 and the boom assembly 12. The springs 42 will normally hold the arm 18 in a vertical plane with the boom 12, but will allow this transverse movement to occur without any damage or shock load to rigid connections.

In addition, the arm actuating piston and cylinder 20 may be connected to the adjustable strap 46 instead of strap 44 to provide a control point nearer to the load and thus provide a better support but at a different range of angular movement at its connection to the band support 44.

In addition, the boom assembly with the A frame 34 and the first and second linkage members 26 and 28 provide an operating structure which will not only provide the desired movement of the boom assembly 12 but which will carry a greater part of the load and therefore will not require an excessive stroke or strength for use with the hydraulic cylinder and piston assembly 16.

The present invention, therefore, is well suited and adapted to attain the ends and objects herein as well as others inherent therein. While a presently preferred embodiment of the invention is given for the purpose of disclosure, numerous changes in the details of construction and arrangement of parts may be made which are within the spirit of the invention and the scope of the appended claims..

What is claimed is:

1. A hydraulically actuated pipe laying side boom attachment for attachment to the side of a tractor comprising,
    a boom assembly adapted to be pivotally connected to the side of a tractor,
    said boom including a first linkage member adapted to be pivotally connected to the side of the tractor,
    a second linkage member pivotally connected to the first linkage member,
    an A-frame member pivotally adapted to be connected to the tractor and pivotally connected to the second linkage member,
    a first hydraulic piston and cylinder assembly pivotally connected to the boom assembly and adapted to be pivotally connected to the site of the tractor for moving the boom toward and away from the tractor,
    an arm pivotally secured to the boom for movement toward and away from the boom,
    a second hydraulic piston and cylinder assembly pivotally secured to the boom and to the arm for moving the arm toward and away from the boom,
    said arm including a third piston and cylinder assembly for vertically raising and lowering the end of the arm,
    a pipe gripping assembly supported from said one end of the arm,
    a universal joint connected between the pipe gripping assembly and the arm, and
    a spring positioned between the arm and said pipe gripping assembly for yieldably aligning the pipe gripping assembly longitudinally with the arm.

2. The invention of claim 1 wherein the spring is a coil spring and one end thereof is connected to the arm and the other end thereof is connected to the pipe gripping assembly thereby yieldably and transversely aligning the pipe gripping assembly with reference to the arm.

3. The invention of claim 1 wherein the hydraulic pipe gripping assembly includes,
    a support member,
    a pair of movable gripping jaws pivotally connected to the support member,
    a jaw actuating link pivotally connected to each of the jaws, and
    a piston and cylinder assembly pivotally connected to the jaw actuating links and positioned to move the pivot connection of the links with the assembly past a plane between the pivot connection of links to the jaws thereby locking said jaws.

4. A hydraulically actuated pipe handling side boom attachment for connection to the side of a tractor comprising,
    a boom adapted to be pivotally connected to the side of a tractor,
    a first hydraulic piston and cylinder assembly pivotally connected to the boom and adapted to be pivotally connected to the side of the tractor for moving the boom toward and away from the tractor,
    an arm pivotally secured to the boom for movement toward and away from the boom,
    a second hydraulic piston and cylinder assembly pivotally secured to the boom and to the arm for moving the arm toward and away from the boom,
    a hydraulic pipe gripping assembly connected to the lower end of the arm,
    said arm including a third piston and cylinder assembly for vertically raising and lowering said pipe gripping assembly for vertically moving a length of pipe,
    a universal joint connecting the pipe gripping assembly to the arm, and
    a spring positioned between the arm and said pipe gripping assembly thereby longitudinally and yieldably aligning the pipe gripping assembly with the arm.

5. The invention of claim 4 wherein the spring is a coil spring and one end thereof is connected to the said arm and the second end thereof is connected to the pipe gripping assembly thereby yieldably and transversely aligning the pipe gripping assembly with reference to the arm.

6. A hydraulically actuated pipe handling side boom attachment for connection to the side of a tractor comprising,
    a boom adapted to be pivotally connected to the side of a tractor,
    a first hydraulic piston and cylinder assembly pivotally connected to the boom and adapted to be pivotally connected to the side of the tractor for moving the boom toward and away from the tractor,
    an arm pivotally secured to the boom for movement toward and away from the boom,
    a second hydraulic piston and cylinder assembly pivotally secured to the boom and to the arm for moving the arm toward and away from the boom,
    a hydraulic pipe gripping assembly connected to the lower end of the arm,
    said arm including a third piston and cylinder assembly for vertically raising and lowering said pipe gripping assembly for vertically moving a length of pipe,
    a supporting frame between the arm and said boom,
    said frame being pivotally connected to the boom for movement of the frame toward and away from the boom,
    said frame being pivotally connected in a transverse direction to and supporting the arm whereby the arm is movable transversely and,
    spring means between said frame and the arm to yieldably keep the arm in a vertical plane with the boom.

References Cited by the Examiner

UNITED STATES PATENTS

| | | | |
|---|---|---|---|
| 1,220,899 | 3/1917 | Sorensen | 294—106 X |
| 2,594,720 | 4/1952 | Beck | 212—42.5 X |
| 2,712,873 | 7/1955 | Peterson. | |
| 2,792,953 | 5/1957 | King | 214—146.5 |
| 2,831,589 | 4/1958 | Way. | |
| 2,927,706 | 3/1960 | Mork | 214—138 |
| 3,112,830 | 12/1963 | Podlesak. | |

GERALD M. FORLENZA, *Primary Examiner.*

MORRIS TEMIN, *Examiner.*